US008542631B2

(12) United States Patent
Iseda et al.

(10) Patent No.: US 8,542,631 B2
(45) Date of Patent: Sep. 24, 2013

(54) COMMUNICATION DEVICE AND METHOD FOR INTERNALLY REDIRECTING CONTROL INFORMATION

(75) Inventors: Kohei Iseda, Kawasaki (JP); Tsuguo Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 625 days.

(21) Appl. No.: 12/425,227

(22) Filed: Apr. 16, 2009

(65) Prior Publication Data

US 2009/0201859 A1 Aug. 13, 2009

Related U.S. Application Data

(63) Continuation of application No. PCT/JP2006/325924, filed on Dec. 26, 2006.

(51) Int. Cl.
*H04W 4/00* (2009.01)
*H04J 1/16* (2006.01)
*H04J 3/14* (2006.01)
*H04L 1/00* (2006.01)
*H04L 12/26* (2006.01)
*G01R 31/08* (2006.01)
*G06F 11/00* (2006.01)
*G08C 15/00* (2006.01)

(52) U.S. Cl.
USPC ............................................ 370/328; 370/252

(58) Field of Classification Search
USPC ................................................ 370/360, 328
See application file for complete search history.

(56) References Cited

U.S. PATENT DOCUMENTS

| 5,771,352 | A | | 6/1998 | Nakamura et al. |
| 5,809,405 | A | * | 9/1998 | Yamaura ....................... 455/101 |
| 5,832,368 | A | * | 11/1998 | Nakano et al. ............... 455/63.1 |
| 6,094,577 | A | * | 7/2000 | Han .............................. 455/424 |
| 7,881,218 | B2 | * | 2/2011 | Joung et al. ................... 370/252 |

FOREIGN PATENT DOCUMENTS

| EP | 0680174 A2 | 4/1995 |
| JP | 04287431 | 10/1992 |
| JP | 07297824 | 10/1995 |
| JP | 07298359 | 10/1995 |
| JP | 07336370 | 12/1995 |
| JP | 2006340274 A | 12/2006 |

OTHER PUBLICATIONS

International Search Report dated Mar. 27, 2007.
IEEE Std 802.16-2004 IEEE Standard for Local and metropolitan area networks Part 16: Air Interface for Fixed Broadband Wireless Access Systems IEEE Computer Society and the Microwave Theory and Techniques Society.

(Continued)

*Primary Examiner* — Derrick Ferris
*Assistant Examiner* — Kodzovi Acolatse
(74) *Attorney, Agent, or Firm* — Fujitsu Patent Center

(57) ABSTRACT

A base station unit of a communication device generates control information identical with those generated by other communication devices. The control information includes information defining regions in a radio frame that are used by the communication device and the other communication devices to transmit data. A terminal unit receives data in accordance with the control information. A switching unit changes the connection among the base station unit, the terminal unit and an antenna. When the control information is output from the base station unit, a switch controller operates the switching unit so that the base station unit may be connected to the terminal unit to output the control information to the terminal unit.

9 Claims, 7 Drawing Sheets

(56) References Cited

OTHER PUBLICATIONS

IEEE Std 802.16e IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Std 802.16e-2005 and IEEE Std 802.16-2004/Cor1-2005 Feb. 28, 2006.

Japanese Office Action dated Feb. 22, 2011 received in corresponding Japanese Patent Application No. 2008-550951.

* cited by examiner

| CID=Multicast1<br>Burst start point = a1<br>Burst end point = b1<br>Number of symbols=A(200byte, Equivalent to QPSK) | CID=Multicast5<br>Burst start point = a5<br>Burst end point = b5<br>Number of symbols=A(200byte, Equivalent to QPSK) |
| --- | --- |
| CID=Multicast2<br>Burst start point = a2<br>Burst end point = b2<br>Number of symbols=A(200byte, Equivalent to QPSK) | CID=Multicast...<br>Burst start point = ...<br>Burst end point = ...<br>Number of symbols=A(200byte, Equivalent to QPSK) |
| CID=Multicast3<br>Burst start point = a3<br>Burst end point = b3<br>Number of symbols=A(200byte, Equivalent to QPSK) | CID=Multicast n-1<br>Burst start point = an-1<br>Burst end point = bn-1<br>Number of symbols=A(200byte, Equivalent to QPSK) |
| CID=Multicast4<br>Burst start point = a4<br>Burst end point = b4<br>Number of symbols=A(200byte, Equivalent to QPSK) | CID=Multicast n<br>Burst start point = an<br>Burst end point = bn<br>Number of symbols=A(200byte, Equivalent to QPSK) |

FIG. 3

COMMUNICATION DEVICE AND METHOD FOR INTERNALLY REDIRECTING CONTROL INFORMATION

This application is a continuing application, filed under 35 U.S.C. §111(a), of International Application PCT/JP2006/325924, filed Dec. 26, 2006.

FIELD

The embodiment discussed herein is related to communication devices and methods.

BACKGROUND

Development of ITS (Intelligent Transport System) is being advanced with a view to reducing traffic accidents. An example of the ITS is an inter-vehicle communication system in which each vehicle equipped with a communication device broadcasts information about the vehicle running conditions and the like to other vehicles existing within a radius of several hundred meters.

Meanwhile, in recent years, development of WiMAX (Worldwide Interoperability for Microwave Access), which adopts an OFDMA (Orthogonal Frequency Division Multiple Access) scheme for flexible multiplexing of data in directions of both the frequency and time axes, has also been promoted to provide medium-range, large-capacity wireless communication systems (see, e.g., IEEE 802.16-2004, IEEE 802.16e-2005, and IEEE 802.16-2004/Corl-2005). In ITS, a vehicle-mounted communication device occasionally transmits large-capacity data such as image data, and thus, application of WiMAX systems to inter-vehicle communication is being considered. For example, a vehicle is mounted with a WiMAX base station as a transmitter and also with a WiMAX terminal as a receiver, to enable inter-vehicle communication.

In WiMAX, the base station transmits, to each terminal, a radio frame including a preamble for synchronizing the radio frame, a frame control header (FCH) indicating the size and the like of region (burst) allocation information (map) in the radio frame, and the region (burst) allocation information (map). Using the bursts in the radio frame allocated to the individual terminals, the base station communicates data with the terminals. Namely, the burst is allocated for each communication connection. In the following description, it is assumed that the radio frame is absolutely synchronized by means of the GPS (Global Positioning System) or the like, making it unnecessary to carry out a synchronization acquisition process using the preamble.

Where the communication scheme is broadcast, a burst defined as a multicast connection is received by all terminals. In this case, if radio frames transmitted from vehicles (as base stations) are different in map content, then the map information in one radio frame interferes with that in another, with the result that the terminals fail to locate the bursts and thus are unable to receive data. This arises because the map start position is fixed within the radio frame.

FIG. 7 illustrates a radio frame structure. A radio frame comprises the preamble, the FCH, a DL (Down Link)-MAP, a UL (Up Link)-MAP, DL bursts 1 to 15, and UL bursts 1, 2, . . . . The preamble, the position of the FCH, and the start position of the DL-MAP are fixed. The UL-MAP starts following the end position of the DL-MAP. According to the IEEE 802.16e standards, the DL-MAP and the UL-MAP contain information about the connection IDs of respective bursts, burst start positions, burst end positions, and burst sizes. The information other than the UL bursts 1, 2, . . . is generated by the base station.

Thus, data is transmitted in the bursts from multiple vehicles via multicast connections, and if a DL-MAP differs in content from another, the DL-MAPs interfere with each other because the start positions of the DL-MAPs are fixed, making the terminals unable to receive the data.

Accordingly, in order to prevent the interference of DL-MAPs, radio frames need to be transmitted in such a manner that a single base station mounted on a vehicle is allowed to transmit a radio frame at a time. The length of the radio frame used in WiMAX is generally 5 ms. Thus, where each vehicle transmits information at intervals of 1 s, a total of 200 vehicles in the radio wave coverage area (area with a radius of several hundred meters) can transmit information.

In urban districts, however, a large number of vehicles exist, and a few hundred is not sufficient for the number of vehicles that are allowed to communicate within the radio wave coverage area.

Also, when information indicating the structure of a radio frame is transmitted from multiple communication devices, there is a possibility that communication failure occurs due to interference.

Further, there is another problem that while transmitting information indicative of the radio frame structure, the communication device is unable to receive information indicative of the radio frame structure.

SUMMARY

According to one aspect of the present invention, a communication device for performing wireless communication includes: a base station unit configured to generate control information identical with those generated by other communication devices, the control information including information defining regions in a radio frame which are used by the communication device and the other communication devices to transmit data; a terminal unit configured to receive data in accordance with the control information; a switching unit configured to change connection among the base station unit, the terminal unit and an antenna; and a switch controller configured to operate the switching unit such that when the control information is output from the base station unit, the base station unit is connected to the terminal unit to output the control information to the terminal unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates contents of a DL-MAP;

DESCRIPTION OF EMBODIMENT(S)

The principle of the present invention will be described first with reference to FIG. 1.

Figure 1:
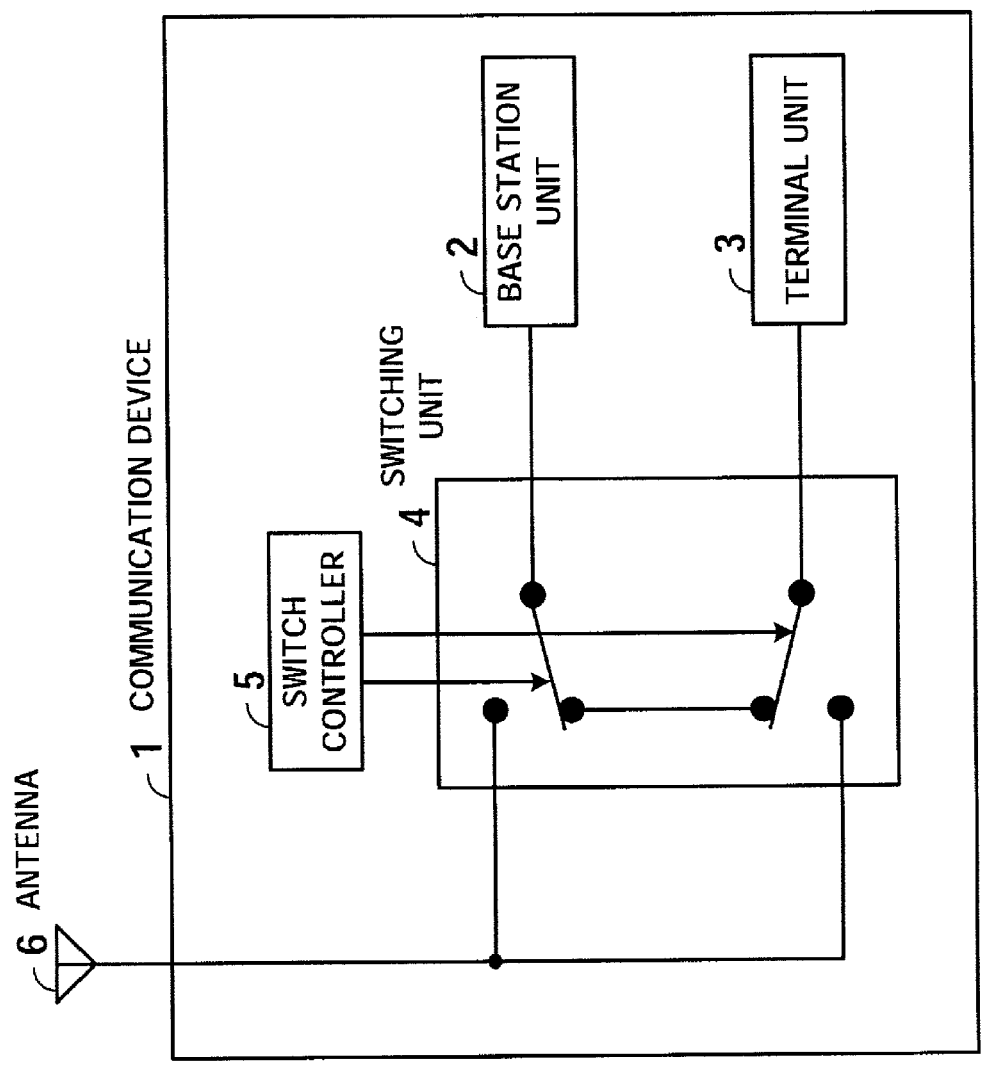
FIG. 1 schematically illustrates a communication device.

FIG. 1 schematically illustrates a communication device. The communication device 1 comprises a base station unit 2, a terminal unit 3, a switching unit 4, a switch controller 5, and an antenna 6.

The base station unit 2 generates control information identical with those generated by other communication devices. The control information includes information defining regions in a radio frame which are used by the communication device 1 and the other communication devices to transmit data. The information defining the regions of a radio frame is identical in content with those generated by the other communication devices. This information merely defines the regions and does not specify which communication devices are to use the respective regions to transmit data.

The terminal unit 3 receives data in accordance with the control information.

The switching unit 4 changes the connection among the base station unit 2, the terminal unit 3, and the antenna 6.

When the control information is output from the base station unit 2, the switch controller 5 operates the switching unit 4 such that the base station unit 2 is connected to the terminal unit 3 to output the control information to the terminal unit 3.

In this manner, the base station unit 2 generates the control information which is identical with those generated by the other communication devices and which includes information defining the regions in a radio frame that are used by the communication device 1 and the other communication devices to transmit data. When the control information is output from the base station unit 2, the switch controller 5 operates the switching unit 4 such that the control information is output to the terminal unit 3, not to the antenna 6. This makes it possible to increase the number of communication devices that can communicate within a radio wave coverage area.

Further, mutual interference of the information indicative of the radio frame structure can be prevented, and it is also possible to solve the problem that the communication device is unable to receive information indicative of the radio frame structure while transmitting the information indicative of the radio frame structure.

An embodiment of the present invention will be now described in detail with reference to the accompanying drawings.

Figure 2:
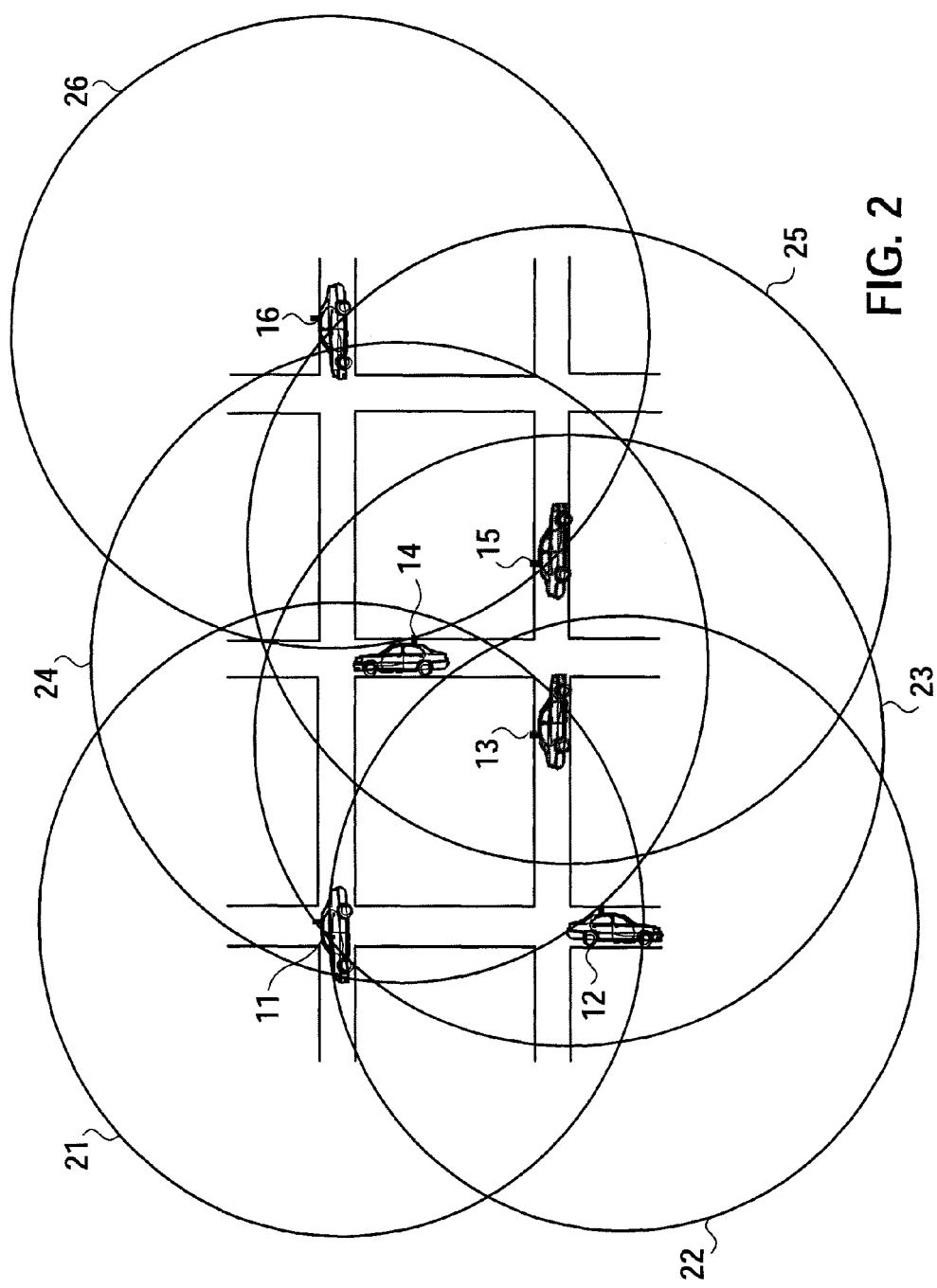
FIG. 2 illustrates inter-vehicle communication among vehicles each mounted with the communication device according to an embodiment.

FIG. 2 illustrates inter-vehicle communication among vehicles each equipped with the communication device of the embodiment. In FIG. 2, vehicles 11 to 16 are illustrated, along with their respective radio wave coverage areas 21 to 26. The radio wave coverage areas 21 to 26 each have a size with a radius of, for example, several hundred meters. The vehicles 11 to 16 are each equipped with the function of a WiMAX base station and the function of a WiMAX terminal to perform the inter-vehicle communication.

The vehicles 11 to 16 (as the base stations) individually broadcast data via radio waves. The broadcast data includes, for example, identification information such as the license plate number of the vehicle that originated the data, and the traveling direction, travelling speed and position of the vehicle. By receiving the broadcast data, each of the vehicles 11 to 16 (as the terminals) can determine what vehicles exist in the surrounding area and in which directions the respective vehicles are moving. Thus, the information serves to prevent traffic accidents from occurring.

The data transmitted from the vehicles 11 to 16 does not reach vehicles located outside the respective radio wave coverage areas 21 to 26. In the radio wave coverage area 21 of the vehicle 11, for example, the vehicles 12 to 14 exist, and therefore, the data transmitted from the vehicle 11 can be received by the vehicles 12 to 14 only.

All vehicles 11 to 16 generate control information with identical content defined beforehand. The control information includes a DL-MAP defining bursts in which the local and other vehicles respectively transmit data via a multicast connection.

When the control information is generated in the vehicles 11 to 16, the generated control information is not transmitted via radio waves but is internally redirected (the control information generated by the functional unit serving as the base station is redirected to the functional unit serving as the terminal). Using the transmission regions defined by the control information, the functional unit serving as the terminal receives data.

In the following, it is assumed that the radio frame is absolutely synchronized by means of the GPS or the like, so that a synchronization acquisition process using the preamble is unnecessary.

FIG. 3 illustrates contents of the DL-MAP. In FIG. 3, "CID" represents the identifier of a communication connection (communication between a base station and a terminal). In the illustrated example, a multicast connection ID ("Multicast 1", "Multicast 2", . . . ) is set as the CID. "Burst start point" and "Burst end point" represent the start and end points, respectively, of a DL burst region. "Number of symbols" indicates information such as the size of a DL burst, a modulation scheme and the like.

In the example illustrated in FIG. 3, the multicast connection ID "1" is assigned to the burst with a burst start point a1 and a burst end point b1. Namely, the communication connection with the multicast connection ID "1" allows communication to be performed using the burst region from the burst start point a1 to the burst end point b1.

In the case of inter-vehicle communication, the amount of data transmitted from the individual vehicles 11 to 16 is determined in advance by the volume of information to be transmitted, such as the identification information identifying the vehicle and information indicating the traveling direction, traveling speed and position of the vehicle, and therefore, is fixed. Accordingly, the data amount indicated by the "Number of symbols" is the same for all multicast connection IDs, as seen from FIG. 3. The burst size is determined by the modulation scheme used and the encoding rate of the error correcting code, both of which are also fixed.

The control information is defined in advance, and the vehicles 11 to 16 all generate an identical DL-MAP as illustrated in FIG. 3.

Figure 4:
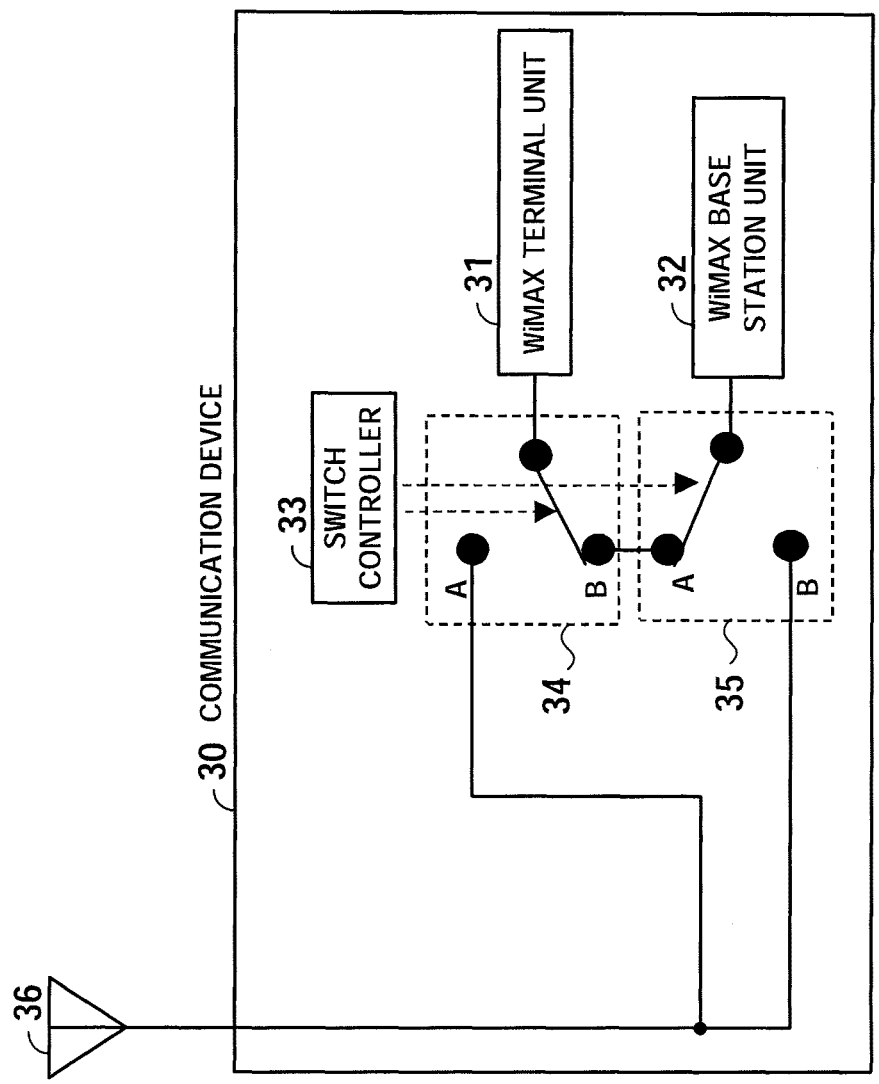
FIG. 4 is a functional block diagram of a communication device mounted on a vehicle.

FIG. 4 is a functional block diagram of a communication device mounted on a vehicle. As illustrated in FIG. 4, the communication device 30 comprises a WiMAX terminal unit 31, a WiMAX base station unit 32, a switch controller 33, switches 34 and 35, and an antenna 36.

The WiMAX terminal unit 31 functions as a WiMAX terminal, and the WiMAX base station unit 32 functions as a WiMAX base station. Namely, the communication device 30 functions as both existing WiMAX terminal and base station.

The switch controller 33 operates the switches 34 and 35 in accordance with the symbol position in the radio frame.

The switch 34 has terminals A and B and, under the control of the switch controller 33, connects the WiMAX terminal unit 31 to one of the terminals A and B. The terminal A of the switch 34 is connected to the antenna 36.

Similarly, the switch 35 has terminals A and B and, under the control of the switch controller 33, connects the WiMAX base station unit 32 to one of the terminals A and B. The terminal B of the switch 35 is connected to the antenna 36, and the terminal A of the switch 35 is connected to the terminal B of the switch 34.

The following describes in detail the switch controller 33.

1. The switch controller 33 controls the switches 34 and 35 so that the WiMAX terminal unit 31 and the WiMAX base station unit 32 may be connected to each other from the beginning of a radio frame up to a symbol corresponding to the termination of the control signal, which includes the preamble, the FCH, the DL-MAP and the UL-MAP, all fixedly allocated in the radio frame. Specifically, the switch controller 33 controls the switches 34 and 35 in such a manner that the WiMAX terminal unit 31 is connected to the terminal B of the switch 34 while the WiMAX base station unit 32 is connected to the terminal A of the switch 35. As stated above, identical control information is generated by the communication devices mounted on the respective vehicles 11 to 16.

The control information output from the WiMAX base station unit 32 is redirected internally, without being transmitted via radio waves, and is directly received by the WiMAX terminal unit 31. This allows the WiMAX terminal unit 31 to recognize that all DL bursts are to be received as multicast data, as well as the sizes and positions of the individual DL bursts.

The DL-MAP indicates the contents illustrated in FIG. 3, for example. Consequently, the WiMAX terminal unit 31 can be notified that all DL bursts are to be received as multicast data, and also notified of the sizes and positions of the respective DL bursts.

2. The switch controller 33 controls the switch 34 so that the WiMAX terminal unit 31 may be connected to the antenna 36 from a symbol corresponding to the start of the first DL burst defined by the DL-MAP up to a symbol immediately preceding the start of a DL burst in which the WiMAX base station unit 32 transmits data.

The communication devices of the other vehicles transmit data in accordance with the DL-MAP that is identical in content and redirected internally in the same manner as mentioned above. Accordingly, the WiMAX terminal unit 31 of the communication device 30 receives the thus-transmitted data through the antenna 36. As the DL bursts are assigned respective different communication connection IDs, the WiMAX terminal unit 31 can recognize that information has been received from different vehicles.

3. The switch controller 33 controls the switch 35 so that the WiMAX base station unit 32 may be connected to the antenna 36 from the symbol corresponding to the start of the DL burst in which the WiMAX base station unit 32 transmits data, up to a symbol corresponding to the end of the data transmission from the WiMAX base station unit 32.

The WiMAX base station unit 32 transmits data only in the DL burst corresponding to the communication connection ID of its own. This communication connection ID is selected at random by the WiMAX base station unit 32, for example, as described later, and the switch controller 33 is controlled accordingly.

4. The switch controller 33 controls the switch 34 so that the WiMAX terminal unit 31 may be connected to the antenna 36 from a symbol immediately following the symbol corresponding to the end of the data transmission from the WiMAX base station unit 32 up to a symbol immediately preceding the beginning of the next radio frame.

The following describes the manner of how the communication device 30 transmits and receives data.

Figure 5:
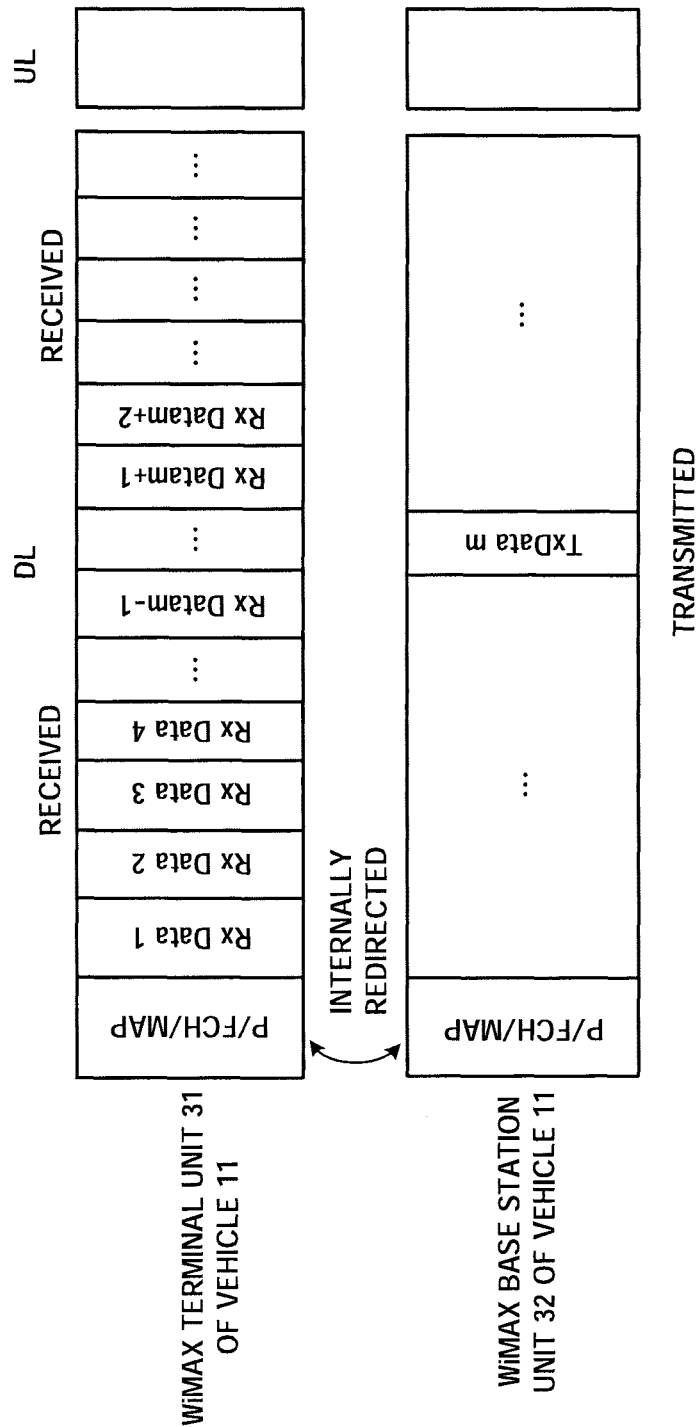
FIG. 5 illustrates transmission and reception of data by the communication device.

FIG. 5 illustrates transmission and reception of data by the communication device. It is assumed that the communication device 30 explained above with reference to FIG. 4 is mounted on the vehicle 11. The WiMAX base station unit 32 of the communication device 30 generates control information including the preamble, the FCH, the DL-MAP, and the UL-MAP. The control information is not transmitted via radio waves but is redirected internally to the WiMAX terminal unit 31 of the communication device 30. This is the case with the other vehicles 12 to 16; namely, the control information with the same content is internally redirected to their WiMAX terminal units.

Let us suppose that the DL burst with the multicast connection ID "m", for example, is selected by the WiMAX base station unit 32 as the DL burst for transmitting data. Likewise, the other vehicles 12 to 16 select respective DL bursts for transmitting data. Let it be assumed, for example, that the DL bursts with the multicast connection IDs "1" and "2" are selected, respectively, by the vehicles 12 and 13.

After the control information is internally redirected, the WiMAX terminal unit 31 of the communication device 30 receives data via the antenna 36 in accordance with the DL-MAP illustrated in FIG. 3, for example. The WiMAX terminal unit 31 recognizes, from the DL-MAP, the DL bursts associated therewith and receives data in the recognized regions. As, in the example of FIG. 3, all DL bursts have their respective multicast connection IDs, the WiMAX terminal unit 31 receives data in all DL bursts.

For example, the WiMAX terminal unit 31 receives "Rx Data 1" in the DL burst corresponding to the multicast connection ID "1", and then receives "Rx Data 2" in the DL burst corresponding to the multicast connection ID "2".

The vehicle 12 transmits data in the DL burst with the multicast connection ID "1", as mentioned above. Thus, "Rx Data 1" indicated in FIG. 5 is the data transmitted from the vehicle 12. Also, the vehicle 13 transmits data in the DL burst with the multicast connection ID "2", and therefore, "Rx Data 2" indicated in FIG. 5 is the data transmitted from the vehicle 13.

Likewise, the WiMAX terminal unit 31 of the communication device 30 thereafter receives data in the respective DL bursts indicated by the DL-MAP.

When the symbol corresponding to the start of the DL burst for transmitting data is reached (when the DL burst corresponding to the multicast connection ID "m" selected by the WiMAX base station unit 32 is reached), the switch controller 33 of the communication device 30 operates the switch 35 such that the WiMAX base station unit 32 is connected to the antenna 36.

Accordingly, the WiMAX base station unit 32 transmits "Tx Data m" in the DL burst corresponding to the multicast connection ID "m". The other vehicles 12 to 16 are receiving data in accordance with the DL-MAP which is identical in content with that of the vehicle 11, and therefore, receive "Tx Data m" from the vehicle 11 in the DL burst with the multicast connection ID "m".

When the transmission of "Tx Data m" is finished, the switch controller 33 of the communication device 30 operates the switch 34 such that the WiMAX terminal unit 31 is connected to the antenna 36. Thus, the WiMAX terminal unit 31 thereafter receives data via the antenna 36 in accordance with the DL-MAP.

The following describes the manner of how the WiMAX base station unit 32 selects the DL burst for transmitting data. In the following, it is assumed that the radio frame has a frame length of 5 ms, that each vehicle transmits data once in a second, and that the number of the DL bursts is 15.

Each vehicle is capable of transmitting a radio frame 200 times per second (1 s/5 ms). As the number of the bursts is 15, each vehicle can transmit data within one-15th of the 5-ms frame. Namely, in this embodiment, the radio wave coverage area can contain up to 200×15 vehicles.

The WiMAX base station unit of each vehicle selects a CID for transmitting data of its own according to Slotted ALOHA, for example. Provided that the CIDs of 200×15 bursts are from "1" to "3000", respectively, the WiMAX base station unit of each vehicle selects a number at random, from among "1" to "3000", and transmits data in the burst corresponding to the selected CID. Accordingly, up to 200×15 vehicles are allowed to communicate within the radio wave coverage area. In this case, the map information is defined in such a manner that the CIDs of the first frame are respectively assigned "1" to "15", the CIDs of the second frame are respectively assigned "16" to "30", and so on. The transmission start timing of the first frame is absolutely synchronized. Thus, the transmission start timing of the first frame is set, for example, at 12:00:0.000, the transmission start timing of the second frame is set at 12:00:0.005, and so on, thereby synchronizing the transmission start timing of each consecutive 200 frame.

The WiMAX base station units of all vehicles select their bursts at random. Accordingly, if the burst with the same CID is selected by more than one WiMAX base station unit, interference of the transmitted data occurs, making the WiMAX terminal unit unable to receive data. Where such interference of data occurs, the WiMAX base station unit continues to select a CID at random and repeatedly transmits data, so that the WiMAX terminal unit becomes able to receive data before long without any interference being caused. The number of times the transmission is repeated needs to be set, however, so that data may be properly transmitted within a data transmission time required by the ITS.

The CID may alternatively be selected by using Reservation ALOHA or ALOHA Reservation.

Operation of the switch controller 33 in the communication device 30 will be now described.

Figure 6:
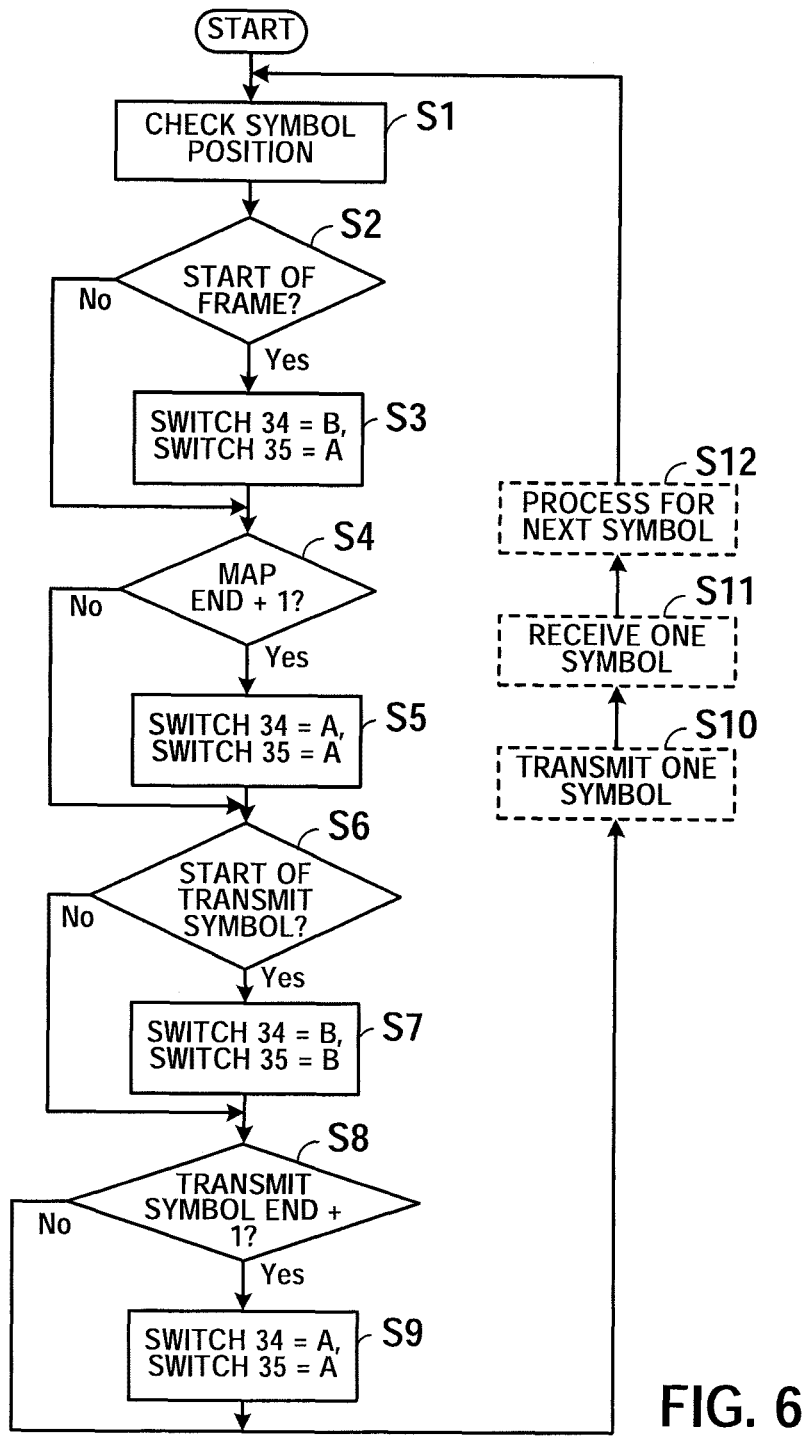
FIG. 6 is a flowchart illustrating operation of a switch controller.
Figure 7:
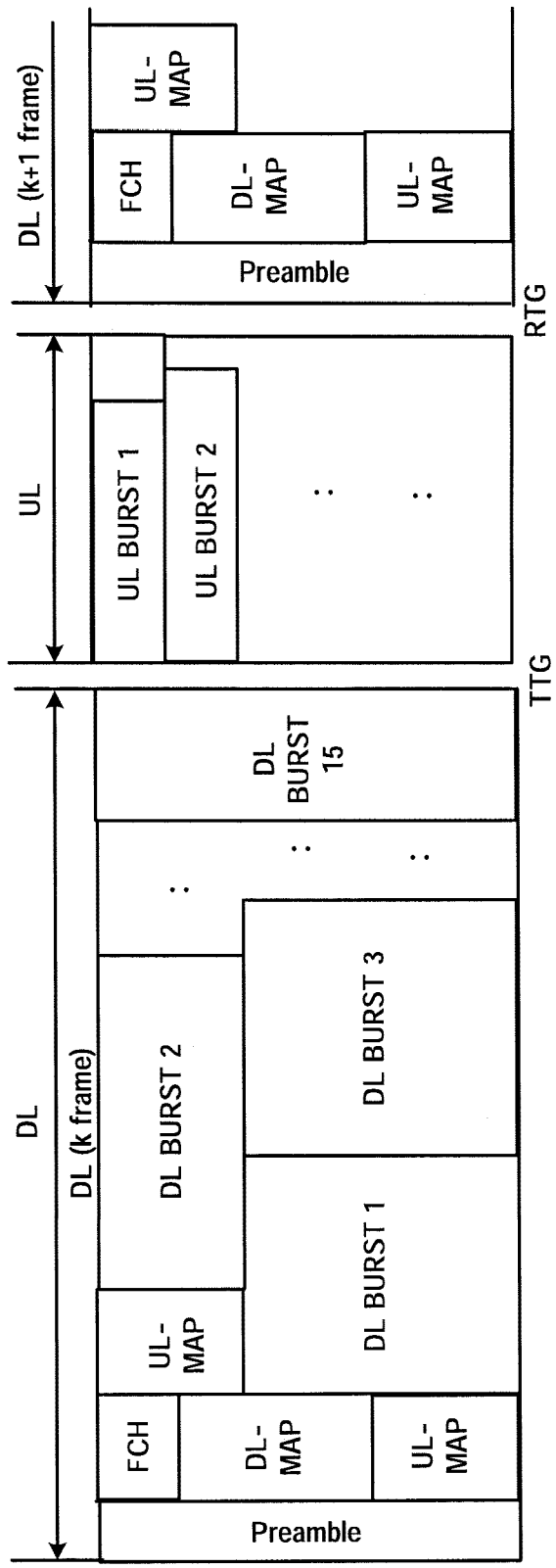
FIG. 7 illustrates a radio frame structure.

FIG. 6 is a flowchart illustrating the operation of the switch controller.

In Step S1, the switch controller 33 checks the symbol position of the radio frame.

Then, in Step S2, the switch controller 33 determines whether or not the symbol position indicates the beginning of the radio frame. If the symbol position indicates the beginning of the radio frame, the process proceeds to Step S3; if not, the process proceeds to Step S4.

In Step S3, the switch controller 33 operates the switch 34 such that the WiMAX terminal unit 31 is connected to the terminal B. In addition, the switch controller 33 operates the switch 35 such that the WiMAX base station unit 32 is connected to the terminal A.

Consequently, the control information of the radio frame is internally redirected from the WiMAX base station unit 32 to the WiMAX terminal unit 31.

In Step S4, the switch controller 33 determines whether or not the symbol position in the radio frame indicates a position immediately following the end of the MAP of the control information, namely, MAP end+1. If the symbol position indicates the MAP end+1, the process proceeds to Step S5; if not, the process proceeds to Step S6.

Then, in Step S5, the switch controller 33 operates the switch 34 such that the WiMAX terminal unit 31 is connected to the terminal A. Further, the switch controller 33 operates the switch 35 such that the WiMAX base station unit 32 is connected to the terminal A.

Accordingly, the WiMAX terminal unit 31 is connected with the antenna 36, to receive data transmitted thereto in the DL bursts in accordance with the DL-MAP.

In Step S6, the switch controller 33 determines whether or not the symbol position in the radio frame indicates the start of the transmit symbol selected by the WiMAX base station unit 32. If the symbol position indicates the start of the transmit symbol, the process proceeds to Step S7; if not, the process proceeds to Step S8.

Subsequently, in Step S7, the switch controller 33 operates the switch 34 such that the WiMAX terminal unit 31 is connected to the terminal B. Also, the switch controller 33 operates the switch 35 such that the WiMAX base station unit 32 is connected to the terminal B.

The WiMAX base station unit 32 is therefore connected to the antenna 36 and transmits data in the DL burst selected thereby.

In Step S8, the switch controller 33 determines whether or not the symbol position in the radio frame indicates a position immediately following the end of the transmit symbol, namely, the transmit symbol end+1. If the symbol position indicates the transmit symbol end+1, the process proceeds to Step S9; if not, the process proceeds to Step S10.

Then, in Step S9, the switch controller 33 operates the switch 34 such that the WiMAX terminal unit 31 is connected to the terminal A. Also, the switch controller 33 operates the switch 35 such that the WiMAX base station unit 32 is connected to the terminal A.

Consequently, the WiMAX terminal unit 31 is connected with the antenna 36 and receives data transmitted thereto in the DL bursts in accordance with the DL-MAP.

When it is judged in Step S6 that the symbol position in the radio frame indicates the start of the transmit symbol, the WiMAX base station unit 32 transmits one symbol of data in Step S10. Step S10 is repeatedly executed until it is judged in Step S8 that the symbol position in the radio frame indicates a position immediately succeeding the end of the transmit symbol.

Also, when it is judged in Step S4 that symbol position in the radio frame indicates the MAP end+1, the WiMAX terminal unit 31 receives one symbol of data in Step S11. Step S11 is repeatedly executed until the symbol position in the radio frame reaches the start of the transmit symbol. When the symbol position in the radio frame thereafter indicates the transmit symbol end+1, the WiMAX terminal unit 31 again starts to receive one symbol of data in Step S11. Step S11 is then repeatedly executed until the symbol position in the radio frame indicates a position immediately preceding the beginning of the next radio frame, namely, next frame start−1.

In Step S12, the WiMAX terminal unit 31 and the WiMAX base station unit 32 advance the time axis of the radio frame by one symbol, to transmit/receive the next symbol.

In this manner, the communication device 30 generates control information identical with those generated by the communication devices mounted on the other vehicles 12 to 16, and the generated control information is internally redirected to the WiMAX terminal unit 31. The control information includes the DL-MAP defining the DL bursts to be used by the communication device 30 as well as by the communication devices of the other vehicles 12 to 16, as illustrated in FIG. 3. This makes it possible to increase the number of vehicles that can communicate within the radio wave coverage area.

Also, in the communication device 30, the switch controller 33 selectively connects the antenna 36 with the WiMAX terminal unit 31 or the WiMAX base station unit 32. It is therefore possible to carry out wireless communication by using the functions of existing WiMAX terminal and base station, without the need to newly define the radio frame structure.

In the foregoing embodiment, the control information is in its entirety redirected internally to the WiMAX terminal unit 31. Instead of redirecting the whole control information to the WiMAX terminal unit 31, part of the control information may be transmitted from the antenna 36 via a radio frame. Also, the WiMAX terminal unit 31 may be configured to receive via the antenna 36 part of the control information from other communication devices. In this case, the individual communication devices 30 randomly transmit and receive radio frames carrying part of the control information, and the WiMAX terminal unit 31 is configured to be able to receive data probabilistically. Further, the above description is based on the assumption that the radio frames are absolutely synchronized by means of the GPS or the like. Where misalignment of the radio frame timing is caused for some reason or other, the misaligned radio frames may be absolutely synchronized by means of the preamble.

Also, the WiMAX base station unit 32 may be configured to select a burst a predetermined number of times within a predetermined interval of time for transmitting data. This makes it possible to reliably transmit data within the data transmission time interval required by the ITS, thus probabilistically guaranteeing the reachability of data.

For example, in FIG. 4, a transmission controller is connected to the switch controller 33 and the WiMAX base station unit 32. The transmission controller holds information about the predetermined time interval and a transmission count indicating the number of times transmission is to be performed within the time interval. Provided that n timeslots within the time interval are "1" to "n", respectively, the transmission controller randomly selects a number of timeslots equal to the transmission count, from among the timeslots "1" to "n", so that data may be transmitted in the selected timeslots.

In the communication device according to the embodiment, the base station unit generates control information which is identical with those generated by other communication devices and which includes information defining regions in a radio frame that are used by the communication device and the other communication devices to transmit data. When the control information is output from the base station unit, the switch controller operates the switching unit so that the control information may be output to the terminal unit, not to the antenna. It is therefore possible to increase the number of communication devices that can communicate within the radio wave coverage area.

Further, according to the embodiment, mutual interference of the information indicative of the radio frame structure can be prevented, and it is also possible to solve the problem that the communication device is unable to receive information indicative of the radio frame structure while transmitting the information indicative of the radio frame structure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that various changes, substitutions and alterations could be made hereto without departing from the spirit and scope of the invention.

What is claimed is:

1. A communication device for performing wireless communication, comprising:
   a base station unit configured to generate control information identical with those generated by other communication devices, the control information including information defining regions in a radio frame which are used by the communication device and the other communication devices to transmit data;
   a terminal unit configured to receive data in accordance with the control information;
   a switching unit configured to change connection among the base station unit, the terminal unit and an antenna; and
   a switch controller configured to operate the switching unit such that when the communication device communicates with other communication devices which include units identical with the base station unit and the terminal unit and the control information is output from the base station unit, the base station unit is connected to the terminal unit to output the control information to the terminal unit;
   wherein, when the terminal unit receives the data in accordance with the control information, the switch controller controls the switching unit such that the terminal unit is connected to the antenna.

2. The communication device according to claim 1, wherein, when the base station unit transmits the data, the switch controller controls the switching unit such that the base station unit is connected to the antenna.

3. The communication device according to claim 1, wherein the control information further includes a preamble and a frame control header.

4. The communication device according to claim 1, wherein the base station unit transmits the data in one of the regions.

5. The communication device according to claim 1, wherein the terminal unit receives the data from the other communication devices in other regions than the region in which the base station unit transmits the data.

6. The communication device according to claim 1, wherein the switch controller operates the switching unit such that the base station unit is connected to the antenna to transmit part of the control information via the radio frame.

7. The communication device according to claim 1, wherein the switch controller operates the switching unit such that the terminal unit is connected to the antenna to receive part of the control information transmitted thereto via the radio frame.

8. The communication device according to claim 1, wherein the base station unit transmits the data in the regions in a predetermined number of times within a predetermined period of time.

9. A communication method for a communication device which comprises a base station unit, a terminal unit, a switching unit and a switch controller configured to perform wireless communication, the communication method comprising:
   generating, by the base station unit, control information identical with those generated by other communication devices, the control information including information defining regions in a radio frame which are used by the communication device and the other communication devices to transmit data;
   receiving, by the terminal unit data, in accordance with the control information; changing, by the switching unit, connection among the base station unit, the terminal unit and an antenna; and operating, by the switch controller, the switching unit such that when the communication device communicates with other communication devices which include units identical with the base station unit and the terminal unit and the control information is output from the base station unit, the base station unit is connected to the terminal unit to output the control information to the terminal unit;

wherein, when the terminal unit receives the data in accordance with the control information, the switch controller controls the switching unit such that the terminal unit is connected to the antenna.

* * * * *